US008348286B2

(12) United States Patent
Arakawa et al.

(10) Patent No.: US 8,348,286 B2
(45) Date of Patent: Jan. 8, 2013

(54) POWER TOOL CARRIERS

(75) Inventors: Takuo Arakawa, Anjo (JP); Shinsuke Tateyama, Anjo (JP); Takuya Sumi, Anjo (JP); Masao Miwa, Anjo (JP); Yasuhiro Kakiuchi, Anjo (JP)

(73) Assignee: Makita Corporation, Anjo-Shi (JP)

( * ) Notice: Subject to any disclaimer, the term of this patent is extended or adjusted under 35 U.S.C. 154(b) by 395 days.

(21) Appl. No.: 12/382,614

(22) Filed: Mar. 19, 2009

(65) Prior Publication Data
US 2009/0243241 A1    Oct. 1, 2009

(30) Foreign Application Priority Data
Mar. 28, 2008    (JP) .................................. 2008-086813

(51) Int. Cl.
B62B 1/00    (2006.01)
(52) U.S. Cl. .................. 280/47.19; 280/47.26
(58) Field of Classification Search .............. 280/47.18, 280/47.19, 47.26, 47.28, 47.29, 651, 654, 280/656; 43/54.1, 55; 294/143, 146
See application file for complete search history.

(56) References Cited

U.S. PATENT DOCUMENTS

| 3,889,860 | A | * | 6/1975 | Lindsey | 294/143 |
| 4,175,769 | A | * | 11/1979 | Kazmark | 280/654 |
| 5,203,815 | A | * | 4/1993 | Miller | 280/47.19 |
| 5,340,135 | A | * | 8/1994 | Womberly | 280/47.19 |
| 5,636,469 | A | * | 6/1997 | Pizzolo et al. | 43/55 |
| 5,944,333 | A | * | 8/1999 | Kent | 280/47.19 |
| 6,082,757 | A | * | 7/2000 | Lin | 280/654 |
| 6,158,749 | A | * | 12/2000 | Roudebush | 280/47.16 |
| 6,341,789 | B1 | * | 1/2002 | Checa et al. | 280/47.28 |
| 6,487,814 | B1 | * | 12/2002 | Arredondo et al. | 43/54.1 |
| 7,121,359 | B2 | | 10/2006 | Frauhammer et al. | |
| 7,320,470 | B1 | * | 1/2008 | Butera | 280/47.18 |
| 7,407,171 | B2 | * | 8/2008 | Roberson | 280/47.18 |
| 7,451,833 | B2 | | 11/2008 | Hahn | |
| 7,703,795 | B2 | * | 4/2010 | Williamson | 280/656 |
| 7,819,407 | B1 | * | 10/2010 | Charitun | 280/47.18 |
| 7,934,688 | B2 | * | 5/2011 | Wilk et al. | 248/177.1 |
| 7,934,730 | B2 | * | 5/2011 | Francis et al. | 280/47.29 |
| 2002/0070517 | A1 | * | 6/2002 | Ramsey | 280/47.19 |
| 2003/0011173 | A1 | * | 1/2003 | Shall | 280/651 |
| 2007/0045973 | A1 | * | 3/2007 | Grosso | 280/47.26 |

FOREIGN PATENT DOCUMENTS
JP    U-55-121768    8/1980
(Continued)

OTHER PUBLICATIONS

Jun. 12, 2012 Office Action issued in Japanese Patent Application No. 2008-086813 (with translation).

*Primary Examiner* — Hau Phan
(74) *Attorney, Agent, or Firm* — Oliff & Berridge, PLC

(57) ABSTRACT

A carrier for carrying a power tool may include a tool bit holder supporting at least one tool bit and a tool bit restraint device that is capable of preventing the at least one tool bit from being dropped out of the tool bit holder. The tool bit restraint device includes a tool bit restraint member. The tool bit restraint member is arranged and constructed so as to substantially uniformly press the at least one tool bit, thereby restraining the at least one tool bit.

20 Claims, 11 Drawing Sheets

FOREIGN PATENT DOCUMENTS

| | | |
|---|---|---|
| JP | U-58-151385 | 10/1983 |
| JP | U-59-46684 | 3/1984 |
| JP | U-60-125082 | 8/1985 |
| JP | U-3-52085 | 5/1991 |
| JP | A-07-251744 | 10/1995 |
| JP | A-11-151683 | 6/1999 |
| JP | A-2001-39309 | 2/2001 |
| JP | A-2006-512216 | 4/2006 |
| JP | A-2006-315146 | 11/2006 |
| JP | A-2007-1005 | 1/2007 |

* cited by examiner

POWER TOOL CARRIERS

This application claims priority to Japanese patent application serial number 2008-086813, the contents of which are incorporated herein by reference.

BACKGROUND OF THE INVENTION

1. Field of the Invention

The present invention relates to power tool carriers. More particularly, the present invention relates to power tool carriers generally called hammer carts that are capable of carrying power tools (e.g., power hammers and power breakers) and tool bits (e.g., hammer bits and breaker bits) that are attached to the power tools. Further, the hammer bits and the breaker bits will be simply referred to as bits.

2. Description of Related Art

Generally, it is difficult to carry a relatively large power tool in hand. Examples of such a power tool are a power hammer and a power breaker that are used to chip a concrete product or to crush a concrete block. Therefore, in order to carry the power tool, a power tool carrier (a hammer cart) having wheels is used. Further, in order to transport the power tool by a vehicle, the power tool is loaded into the vehicle with the power tool carrier while the power tool is put on the power tool carrier.

Conventionally, the power tool carrier is constructed such that a plurality of tool bits (e.g., hammer bits and breaker bits) can be held thereon. That is, the conventional power tool carrier has a tool bit holder that is composed of a plurality of vertical cylindrical bit holding sleeves. The bit holding sleeves are arranged and constructed such that the tool bits can be vertically inserted thereinto from above while they are directed downwardly. Thus, the tool bits can be held vertically on the tool bit holder (the bit holding sleeves).

According to the power tool carrier, it is possible to easily carry the power tool together with the tool bits. In addition, it is possible to easily store the power tool and the tool bits by simply keeping the power tool carrier upright.

However, when the power tool carrier is in a lying position, the tool bits can be dropped out of the bit holding sleeves. In particular, when the power tool carrier is loaded into the vehicle while maintained in the lying position in order to transport the power tool by the vehicle, the tool bits can be easily dropped out of the bit holding sleeves by vibration or sudden movement of the vehicle.

Conventionally, in order to avoid the tool bits from being dropped out of the bit holding sleeves, the tool bits are simply elastically clamped by rubber bands. However, such rubber bands cannot sufficiently and uniformly fasten the tool bits. As a result, the rubber bands cannot reliably prevent the tool bits from being dropped out of the bit holding sleeves of the tool bit holder.

Such a power tool carrier is taught, for example, by Japanese Laid-Open Patent Publication Numbers 2007-1005, 2006-512216 and 11-151683.

BRIEF SUMMARY OF THE INVENTION

In one aspect of the present invention, a carrier for carrying a power tool may include a tool bit holder supporting at least one tool bit and a tool bit restraint device that is capable of preventing the at least one tool bit from being dropped out of the tool bit holder. The tool bit restraint device includes a tool bit restraint member. The tool bit restraint member is arranged and constructed so as to substantially uniformly press the at least one tool bit, thereby restraining the at least one tool bit.

According to this aspect, the at least one tool bit can be reliably restrained by the tool bit restraint member. Therefore, the at least one tool bit can be effectively prevented from being dropped out of the tool bit holder even when the carrier is in a lying position.

Optionally, the tool bit restraint member can be arranged and constructed so as to cover the at least one tool bit. In this structure, the at least one tool bit can be similarly reliably restrained by the tool bit restraint member, so as to be effectively prevented from being dropped out of the tool bit holder.

Other objects, features and advantages of the present invention will be readily understood after reading the following detailed description together with the accompanying drawings and the claims.

DETAILED DESCRIPTION OF THE INVENTION

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

Detailed representative embodiments of the present invention are shown in FIG. 1 to FIG. 16.

First Detailed Representative Embodiment

A first detailed representative embodiment of the present invention is shown in FIG. 1 to FIG. 5. In the embodiment, a power toot carrier 10 (which will be simply referred to as a carrier 10) for carrying a power tool 1 (e.g., a power hammer or a power breaker) is constructed so as to be handled by a user that is positioned in front of the carrier 10.

Figure 1:
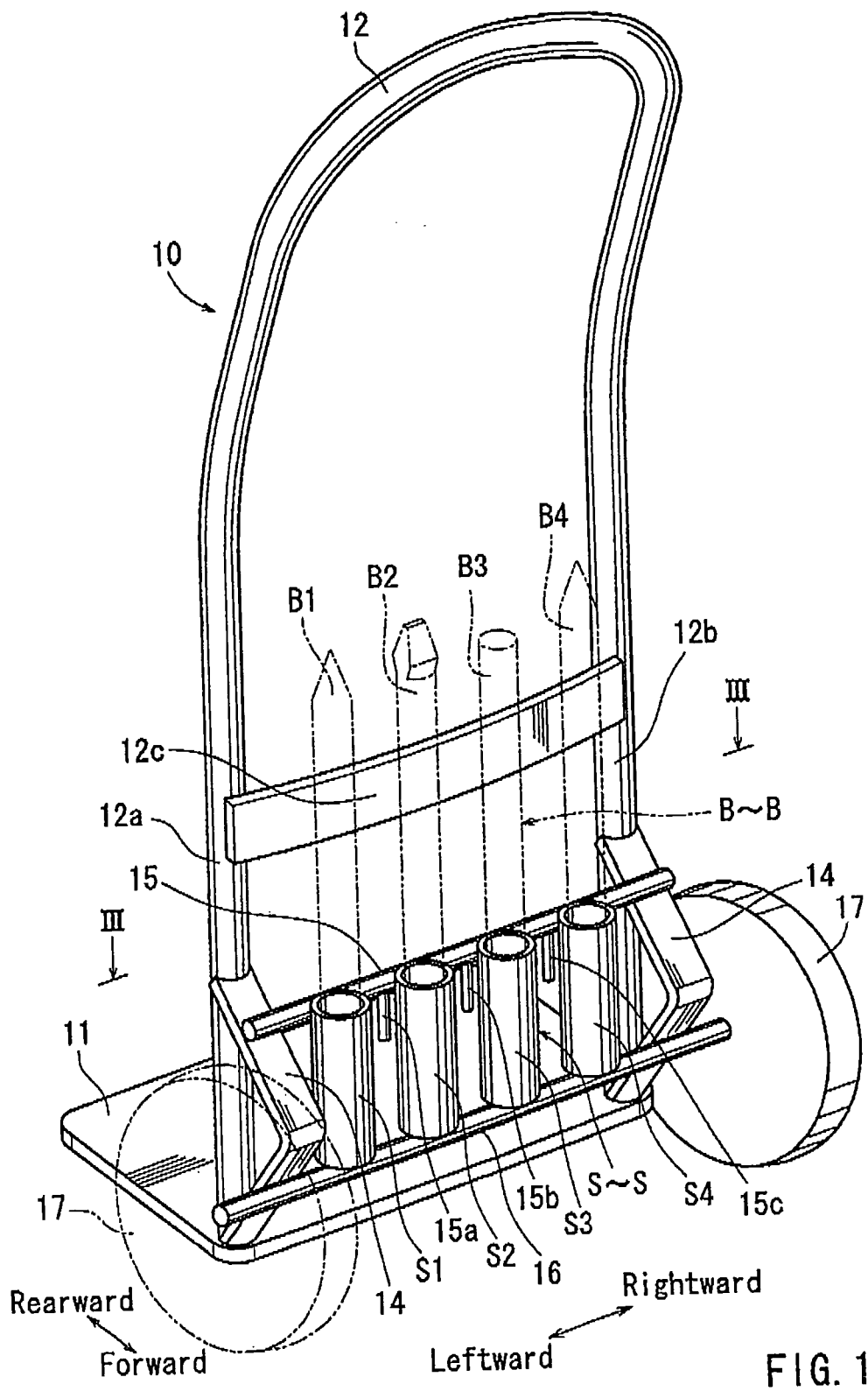
FIG. 1 is a front perspective view of a power tool carrier according to a first representative embodiment of the present invention, viewed from a user's position, in which tool bits are shown by broken lines.

As shown in FIG. 1, the carrier 10 includes a plate-shaped base member 11 that is capable of supporting the power tool 1 (FIG. 2) and a U-shaped handle 12 that extends upwardly from lateral end portions of the base member 11. The handle 12 may preferably include a pair of leg portions 12a and 12b connected to the base member 11 and an upper curved portion connecting the leg portions 12a and 12b. The upper curved portion of the handle 12 may preferably be bent forwardly for easier handling. Disposed on the base member 11 is a cylindrically-shaped support column 13 that is capable of supporting the power tool 1. The support column 13 is secured to the base member 11 and extends vertically upwardly from the base member 11. Further, the support column 13 may preferably be positioned in the center of the base member 11. The support column 13 is shaped so as to engage a bit attachment port that is formed in the power tool 1. Therefore, the power tool 1 can be attached to the support column 13 while the bit attachment port of the power tool 1 engages the support column 13. Thus, the power tool 1 can be supported on the base member 11 via the support column 13 while it is directed downwardly. Preferably, the power tool 1 thus supported is fastened to the handle 12 via a fastening belt (not shown), so as to be reliably supported on the base member 11.

As shown in FIG. 1, the leg portions 12a and 12b of the handle 12 are connected to each other via a transverse reinforcement plate 12c that extends therebetween, so that the handle 12 can be structurally reinforced or rigidified. Further, a pair of V-shaped brackets 14 are respectively attached to the leg portions 12a and 12b of the handle 12. The brackets 14 are arranged so as to project forwardly from the leg portions 12a and 12b. An upper reinforcement bar 15 is attached to the brackets 14, so as to transversely extend therebetween. Further, a lower support bar 16 is attached to the brackets 14, so as to transversely extend therebetween. The upper and lower bars 15 and 16 may preferably be vertically spaced from each other. Also, the upper and lower bars 15 and 16 may preferably be positioned in parallel with each other.

Both ends of the support bar 16 are laterally projected from the brackets 14. A pair of wheels 17 are rotatably attached to the projected both ends of the support bar 16. Therefore, the carrier 10 can be easily moved by gripping the handle 12 and by pulling or pushing the carrier 10. Naturally, the carrier 10 is generally moved while it is maintained in a normal or standing position. (FIG. 1).

Further, because the brackets 14 are projected forwardly from the leg portions 12a and 12b of the handle 12, when the carrier 10 is rotated forwardly about the wheels 17 until the carrier 10 reaches a lying position, the brackets 14 can contact the ground so as to fiction as wheel stoppers or supports.

The carrier 10 has a tool bit holder that is essentially composed of a single or a plurality of (four in this embodiment) open-ended cylindrical bit holding sleeves S. The bit holding sleeves S are vertically disposed between the brackets 14. Each of the bit holding sleeves S has the same shape and the same size. The bit holding sleeves S are positioned in front of the reinforcement bar 15 while they are seated on the support bar 16. Further, the bit holding sleeves S are laterally positioned at substantially equal intervals. The bit holding sleeves S thus positioned are connected to the reinforcement bar 15 and the support bar 16, for example, by welding. Thus, the bit holding sleeves S are integrally attached to the carrier 10. The bit holding sleeves S thus attached are positioned in front of the leg portions 12a and 12b of the handle 12 at a distance.

Because the bit holding sleeves S are seated on the support bar 16, lower end openings of the bit holding sleeves S are substantially closed by the support bar 16. That is, each of the bit holding sleeves S has a substantially open-topped or bottomed cylindrical shape. Therefore, a single or a plurality of (four in this embodiment) tool bits B can be inserted into the bit holding sleeves S from above. Further, the inserted tool bits B can contact the support bar 16, so as to be reliably retained in the bit holding sleeves S.

Further, the four bit holding sleeves S may respectively be referred to as first to fourth bit holding sleeves S1-S4 hereinafter, so as to be distinguished from each other. Similarly, the tool bits B that are inserted into the first to fourth bit holding sleeves S1-S4 may respectively be referred to as first to fourth tool bits B1-B4 hereinafter. Generally, the tool bits B1-B4 may have different shapes and functions.

Figure 2:
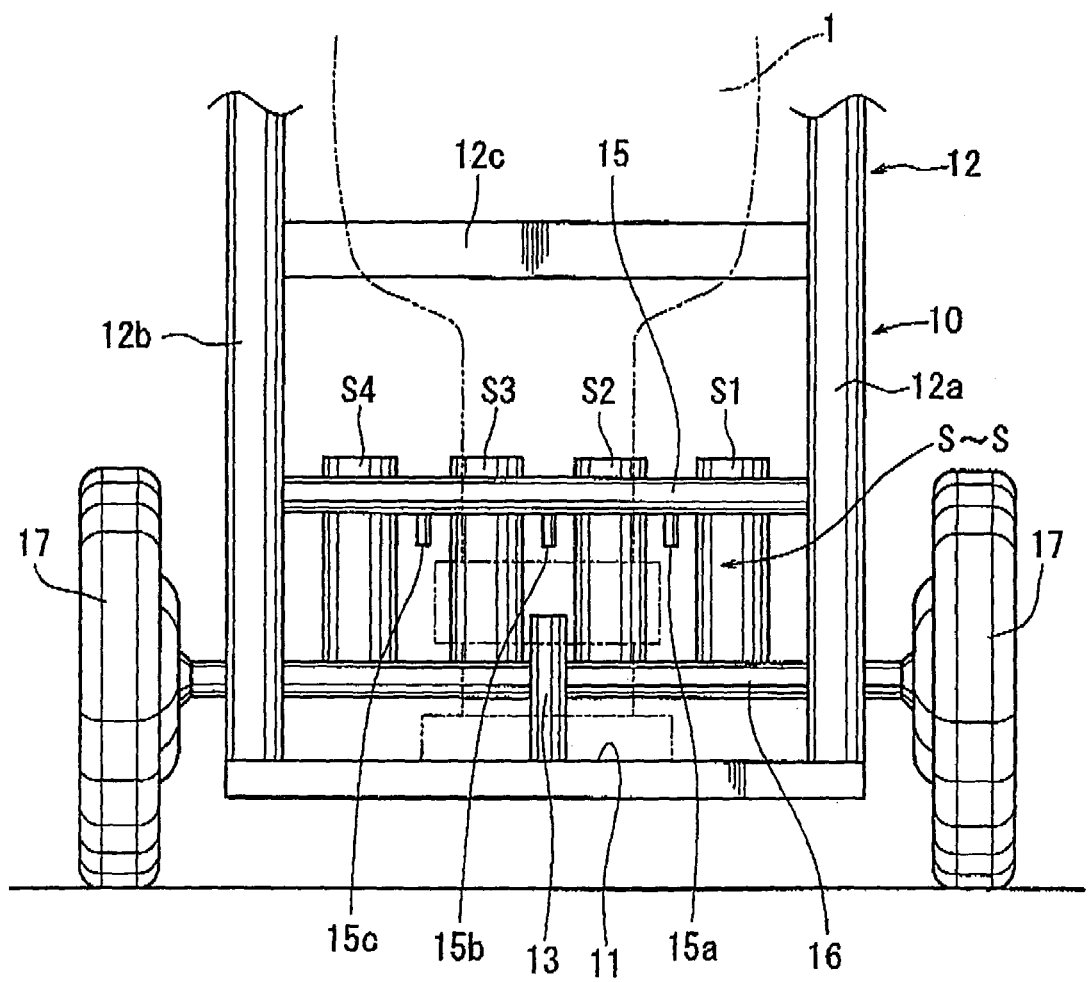
FIG. 2 is a partially rear elevational view of the power tool carrier, in which a power tool is shown by broken lines and in which the tool bits are omitted.
Figure 3:
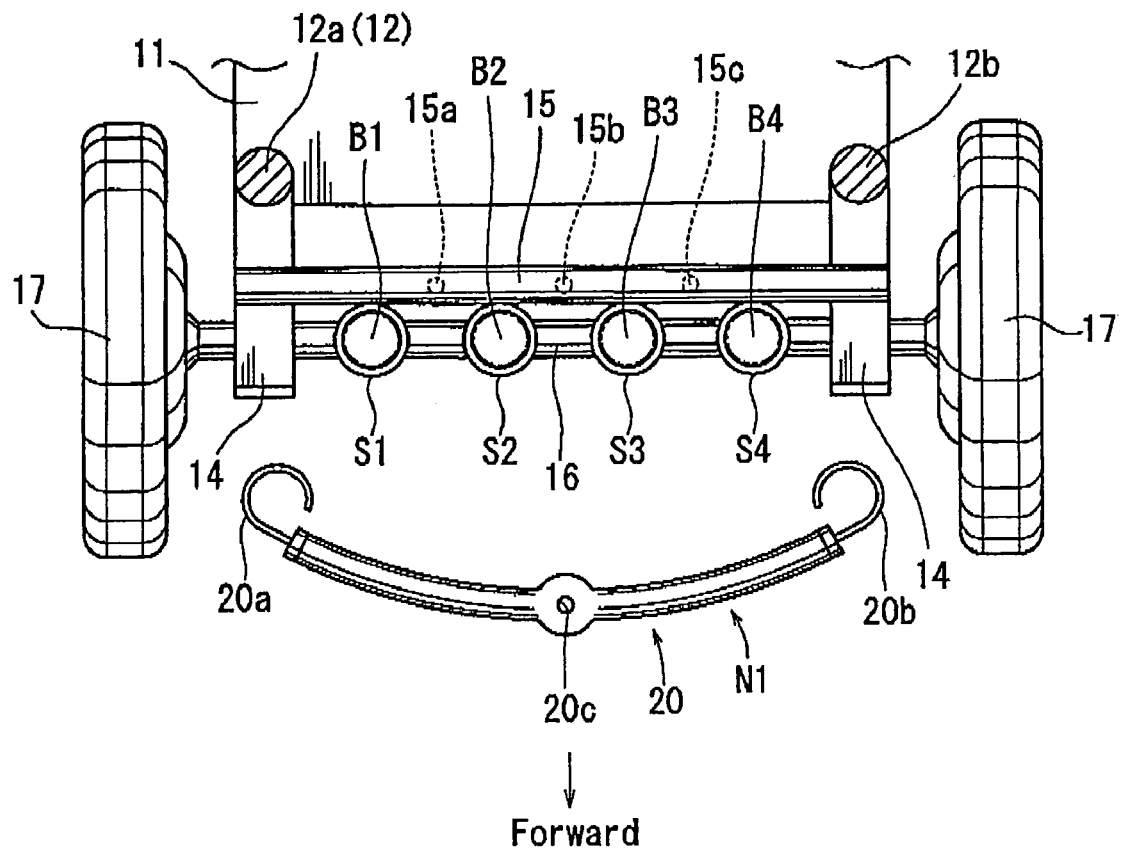
FIG. 3 is a plan view of the power tool carrier viewed from lines III-III of FIG. 1, which view illustrates a condition in which a tool bit restraint member of a tool bit restraint device is not attached to the power tool carrier, and in which the power tool is omitted.
Figure 4:
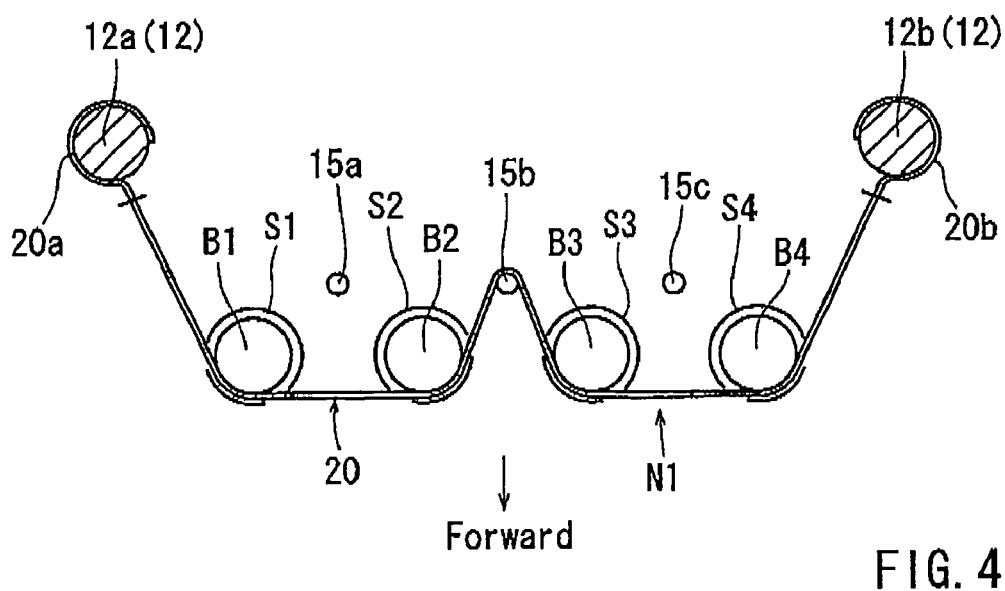
FIG. 4 is a plan view of the tool bit restraint device, which view illustrates a condition in which the tool bit restraint member is attached to the power tool carrier while engaging one of engagement projections.

As shown in FIG. 3, the carrier 10 has a tool bit restraint device N1 in order to prevent the tool bits B from being dropped out of the bit holding sleeves S. As shown in FIGS. 3 and 4, the tool bit restraint device N1 may preferably include an elastomer or rubber band 20 (a tool bit restraint member) and a plurality of (three in this embodiment) engagement projections 15a-15c (an engagement member). As shown in FIG. 3, the rubber band 20 has a pair of hooks 20a and 20b attached to both ends thereof. Further, the rubber band 20 has an engagement hole 20c that is formed in a central portion thereof. Conversely, as best shown in FIGS. 1 and 2, the engagement projections 15a-15c are respectively attached to the reinforcement bar 15 so as to project downwardly therefrom. Each of the engagement projections 15a-15c may preferably be positioned between the two adjacent bit holding sleeves S. Further, the engagement projections 15a-15c can respectively be attached to the reinforcement bar 15 so as to project upwardly therefrom, if necessary.

In order to fasten the first to fourth tool bits B1-B4 that are respectively received in the first to fourth bit holding sleeves S1-S4, first, the rubber band 20 is positioned in front of the first to fourth tool bits B1-B4 and is then attached to the leg portions 12a and 12b of the handle 12 via the hooks 20a and 20b. Thereafter, the engagement hole 20c of the rubber band 20 is hooked on the central engagement projection 15b. As a result the first to fourth tool bits B1-B4 are substantially uniformly pressed rearwardly by an elastic force of the rubber band 20. Thus, as shown in FIG. 4, the first to fourth tool bits B1-B4 are fastened two by two via the rubber band 20, so as to be put in restraint conditions in which they are restrained by the rubber band 20. As a result, the first to fourth tool bits B1-B4 can be reliably retained in the first to fourth bit holding sleeves S1-S4.

Naturally, length of the rubber band 20 is determined such that the first to fourth tool bits B1-B4 can be appropriately fastened.

As previously described, the bit holding sleeves S are positioned in front of the leg portions 12a and 12b of the handle 12 at a distance. Therefore, when the rubber band 20 are hooked on the leg portions 12a and 12b of the handle 12, the tool bits B received in the bit holding sleeves S can be strongly and uniformly pressed by the rubber band 20, so as to be firmly and uniformly fastened. As a result, the tool bits B can be reliably prevented from being dropped out of the bit holding sleeves S even when the carrier 10 is in the lying position. In addition, when the carrier 10 is moved while it is maintained in the standing position, the rubber band 20 may function to effectively prevent the tool bits B from rattling in the bit holding sleeves S.

Figure 5:
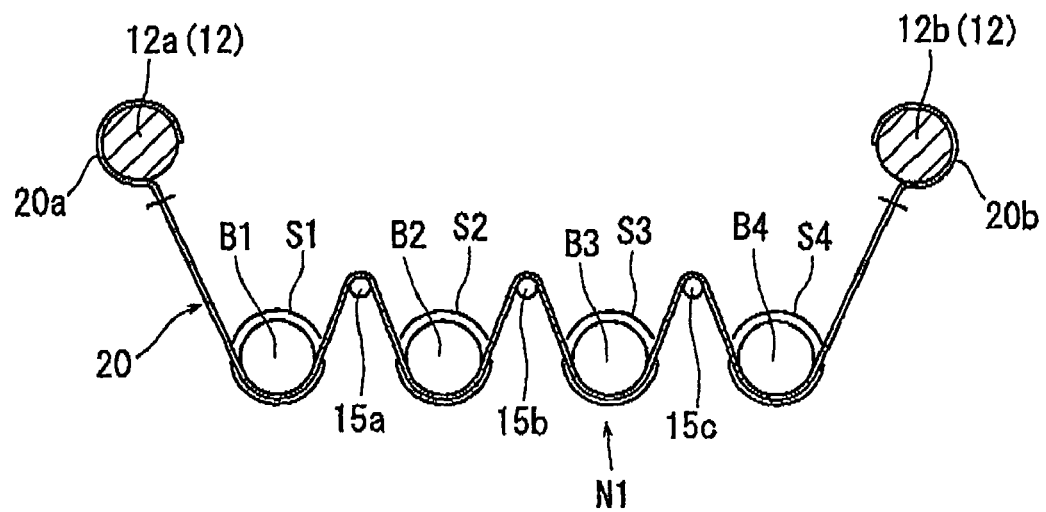
FIG. 5 is a plan view of the tool bit restraint device, which view illustrates a condition in which the tool bit restraint member is attached to the power tool carrier while engaging all of the projections.

Further, as shown in FIG. 5, the rubber band 20 can be additionally hooked on the engagement projections 15a and 15c such that the tool bits B can be fastened substantially separately, if necessary. In this case, the tool bits B can be further strongly pressed by the rubber band 20, so as to be further firmly fastened. As a result, the tool bits B can be further reliably prevented from being dropped out of the bit holding sleeves S even when the carrier 10 is in the lying position.

Further, in order to take out one of the tool bits B from the bit holding sleeves S, for example, in order to take out the third tool bit B3 from the third bit holding sleeve S3, a portion of the rubber band 20 corresponding to the third tool bit B3 is simply pulled forwardly so as to release the restraint condition of the third tool bit B3. As a result, the third tool bit B3 is put in a restraint release condition in which the third tool bit B3 is not restrained by the rubber band 20. Thus, the third tool bit B3 can be easily taken ok out from the third bit holding sleeve S3. Similarly, the third tool bit B3 can be easily put back to the third bit holding sleeve S3 after use.

Further, in this embodiment, the rubber band 20 can be replaced with a leather belt, a wire or other such members.

Second Detailed Representative Embodiment

Figure 6:
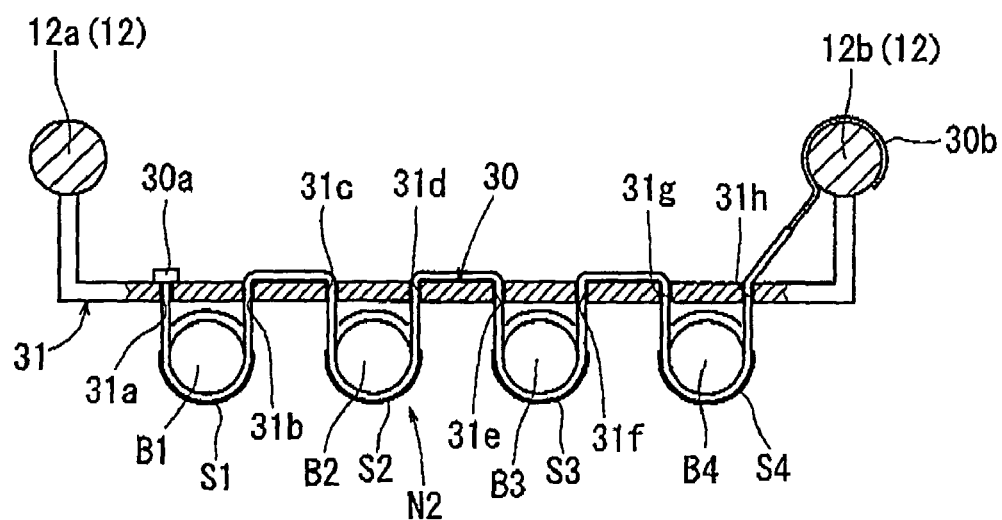
FIG. 6 is a plan view of a tool bit restraint device of a power tool carrier according to a second representative embodiment.

The second detailed representative embodiment will now be described in detail with reference to FIG. 6.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

In this embodiment, the carrier 10 has a tool bit restraint device N2 in place of the tool bit restraint device N1 of the first embodiment. The tool bit restraint device N2 may preferably include an elastomer or rubber band 30 (the tool bit restraint member) and a fixture plate 31 (the engagement member) in place of the rubber band 20 and the engagement projections 15a-15c of the tool bit restraint device N1 of the first embodiment. The rubber band 30 has an engagement flange 30a attached to one end thereof and a hook 30b attached to the other end thereof. Conversely, the fixture plate 31 is transversely positioned between the leg portions 12a and 12b of the handle 12 and is fixedly connected thereto. Four pairs of (eight) insertion holes 31a-31h are formed in the fixture plate 31. These pairs may preferably respectively be positioned so as to substantially correspond to the bit holding sleeves S (the tool bits B). For example, the pair of the insertion holes 31a and 31b may preferably be positioned so as to correspond to the first bit holding sleeve S1 (the first tool bit B1). Further, the insertion holes 31a-31h may respectively be referred to as first to eighth insertion holes 31a-31h hereinafter, so as to be distinguished from each other.

In order to fasten the first to fourth tool bits B1-B4 that are respectively received in the first to fourth bit holding sleeves S1-S4, first, the hook 30b of the rubber band 30 is inserted into the first insertion hole 31a from a rear side of the fixture plate 31, so that the rubber band 30 is passed through the first insertion hole 31a. Subsequently, the rubber band 30 is wrapped around the first tool bit B1 before the hook 30b of the rubber band 30 is inserted into the second insertion hole 31b from a front side of the fixture plate 31, so that the rubber band 30 is passed through the second insertion hole 31b. Thereafter, the rubber band 30 is similarly passed through the third to eighth insertion holes 31c-31h in series while the rubber band 30 is wrapped around each of the second to fourth tool bits B2-B4. Finally, the hook 30b of the rubber band 30 is pulled out from the rear side of the fixture plate 31 via the eighth insertion hole 31h and is hooked on the leg portion 12b of the handle 12. As a result, the first to fourth tool bits B1-B4 are respectively pressed rearwardly by an elastic force of the rubber band 30. Thus, as shown in FIG. 6, the first to fourth tool bits B1-B4 are fastened via the rubber band 30, so as to be put in restraint conditions in which they are restrained by the rubber band 30. As a result, the first to fourth tool bits B1-B4 can be reliably retained in the first to fourth bit holding sleeves S1-S4.

Further, in order to take out one of the tool bits B from the bit holding sleeves S, for example, in order to take out the third tool bit B3 from the third bit holding sleeve S3, a portion of the rubber band 30 corresponding to the third tool bit B3 is pulled forwardly so as to release the restraint condition of the third tool bit B3. As a result, the third tool bit B3 is put in a restraint release condition in which the third tool bit B3 is not restrained by the rubber band 30. Thus, the third tool bit B3 can be easily taken out from the third bit holding sleeve S3. Similarly, the third tool bit B3 can be easily put back to the third bit holding sleeve S3 after use.

Naturally, the engagement flange 30a and the hook 30b of the rubber band 30 can be replaced with each other. Also, the engagement flange 30a can be replaced with a hook (not shown). In this case, the hook is hooked on the leg portion 12a of the handle 12.

Third Detailed Representative Embodiment

The third detailed representative embodiment will now be described in detail with reference to FIG. 7.

Because the third embodiment relates to the first embodiment, only the constructions and elements that are different from the first embodiment will be explained in detail. Elements that are the same in the first and third embodiments will be identified by the same reference numerals and a detailed description of such elements may be omitted.

In this embodiment, the carrier 10 has a tool bit restraint device N3 in place of the tool bit restraint device N1 of the first embodiment. Unlike the tool bit restraint device N1, the tool bit restraint device N3 may preferably include a belt-shaped leaf spring or spring band 40 (the tool bit restraint member) in place of the rubber band 20 of the tool bit restraint device N1. However, the tool bit restraint device N3 does not include engagement projections corresponding to the engagement projections 15a-15c (the engagement member) of the rubber band 20 of the tool bit restraint device N1. Similar to the rubber band 20 of the tool bit restraint device N1, the spring band 40 has a pair of hooks 40a and 40b formed in both ends thereof. Further, the spring band 40 does not have an engagement hole corresponding to the engagement hole 20c of the rubber band 20 of the tool bit restraint device N1.

Figure 7:
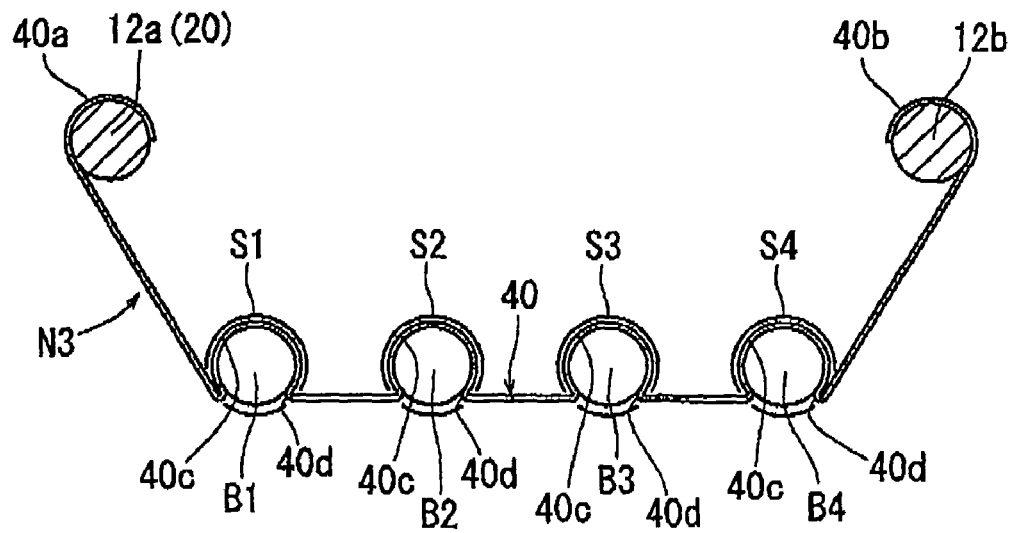
FIG. 7 is a plan view of a tool bit restraint device of a power tool carrier according to a third representative embodiment.

As will be apparent from FIG. 7, four C-shaped retainer recesses 40c are formed in the spring band 40. In particular, each of the retainer recesses 40c has a circular arc-shape having a diameter that is slightly smaller than the diameter of each of the tool bits B. Also, each of the retainer recesses 40c has an opening 40d that is opened forwardly. Each of the openings 40d has a width that is slightly smaller than the diameter of each of the toot bits B. Further, the retainer recesses 40c may preferably be formed at the substantially same intervals as the bit holding sleeves S (the tool bits B).

In order to fasten the first to fourth tool bits B1-B4 that are respectively received in the first to fourth bit holding sleeves S1-S4, first, the spring band 40 is positioned between the first to fourth tool bits B1-B4 and the leg portions 12a and 12b of the handle 12 and is then attached to the leg portions 12a and 12b via the hooks 40a and 40b. Thereafter, the spring band 40 is pressed forwardly against the first to fourth tool bits B1-B4. As a result the first to fourth tool bits B1-B4 can respectively engage the retainer recesses 40c of the spring band 40 while laterally spreading the openings 40d. That is, the first to fourth tool bits B1-B4 can respectively be snap-fitted into the retainer recesses 40c via the openings 40d. The first to fourth tool bits B1-B4 fitted into the retainer recesses 40c can be pressed by a spring force of the spring band 40, so as to be reliably retained therein. Thus, the first to fourth tool bits B1-B4 are respectively fastened or held via the spring band 40, so as to be put in restraint conditions in which they are restrained by the spring band 40. As a result, the first to fourth tool bits B1-B4 can be reliably retained in the first to fourth bit holding sleeves S1-S4.

Further, in order to take out one of the tool bits B from the bit holding sleeves S, for example, in order to take out the third tool bit B3 from the third bit holding sleeve S3, a corresponding portion of the spring band 40 is simply moved rearwardly so as to disengage the retainer recess 40c from the third tool bit B3. As a result, the third tool bit B3 is put in a restraint release condition in which the third tool bit B3 is not restrained by the spring band 40. Thus, the third tool bit B3 can be easily taken out from the third bit holding sleeve S3.

Further, in the tool bit restraint device N3, the spring band 40 has the retainer recesses 40c that are previously formed therein. Therefore, the tool bits B can be reliably fastened via the spring band 40 even if some of the bit holding sleeves S are not occupied by the tool bits B.

Fourth Detailed Representative Embodiment

Figure 8:
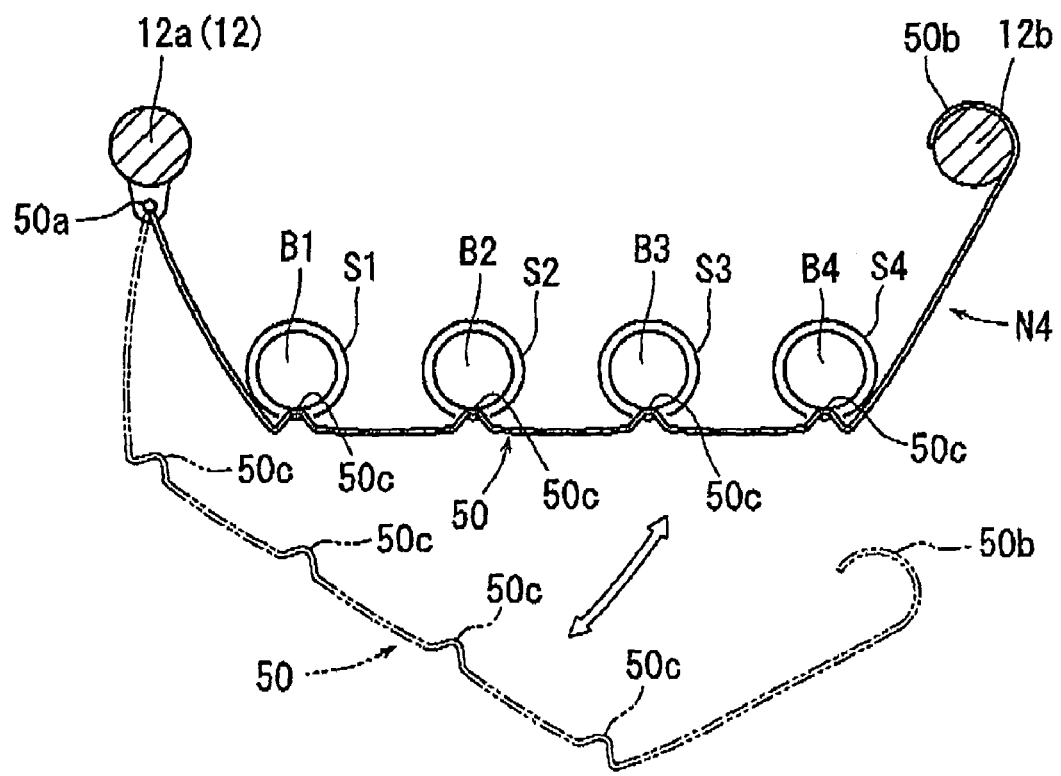
FIG. 8 is a plan view of a tool bit restraint device of a power tool carrier according to a fourth representative embodiment.

The fourth detailed representative embodiment will now be described in detail with reference to FIG. 8.

Because the fourth embodiment relates to the third embodiment, only the constructions and elements that are different from the third embodiment will be explained in detail. Elements that are the same in the third and fourth embodiments will be identified by the same reference numerals and a detailed description of such elements may be omitted.

In this embodiment, the carrier 10 has a tool bit restraint device N4 in place of the tool bit restraint device N3 of the third embodiment. Similar to the tool bit restraint device N3, the tool bit restraint device N4 may preferably include a spring band 50 (the tool bit restraint member). However, unlike the tool bit restraint device N3, the spring band 50 has a support portion 50a formed in one end thereof and a hook 50b formed in the other end thereof. The support portion 50a of the spring band 50 is horizontally rotatably connected to the leg portion 12a of the handle 12. Conversely, the hook 50b of the spring band 50 is constructed to engage the leg portion 12b of the handle 12.

Further, unlike the tool bit restraint device N3, four retainer projections 50c are formed in the spring band 50, so as to be respectively projected rearwardly. The retainer projection 50c may preferably be formed at intervals that substantially correspond to the intervals of the bit holding sleeves S (the tool bits B).

In order to fasten the first to fourth tool bits B1-B4 that are respectively received in the first to fourth bit holding sleeves S1-S4, the spring band 50 is simply rotated about the support portion 50a, so that the hook 50b is hooked on the leg portion 12b of the handle 12. As a result, as shown by solid lines in FIG. 8, the retainer projections 50c of the spring band 50 respectively engage the first to fourth tool bits B1-B4, so as to press the first to fourth tool bits B1-B4 rearwardly by a spring force of the spring band 50. Thus, the first to fourth tool bits B1-B4 are respectively fastened or held via the spring band 50, so as to be put in restraint conditions in which they are restrained by the spring band 50. As a result, the first to fourth tool bits B1-B4 can be reliably retained in the first to fourth bit holding sleeves S1-S4.

Further, in order to take out one of the tool bits B from the bit holding sleeves S, for example, in order to take out the third tool bit B3 from the third bit holding sleeve S3, the hook 50b of the spring band 50 is disengaged from the leg portion 12b of the handle 12, and then the spring band 50 is simply rotated in the reverse direction about the support portion 50a. As a result, as shown by broken lines in FIG. 8, all of the tool bits B are simultaneously put in restraint release conditions in which they are not restrained by the spring band 50. Thus, the third tool bit B3 can be easily taken out from the third bit holding sleeve S3.

Further, in the tool bit restraint device N4, the spring band 50 has the retainer projections 50c that are previously formed therein. Therefore, the tool bits B can be reliably fastened via the spring band 50 even if some of the bit holding sleeves S are not occupied by the tool bits B.

Fifth Detailed Representative Embodiment

Figure 9:
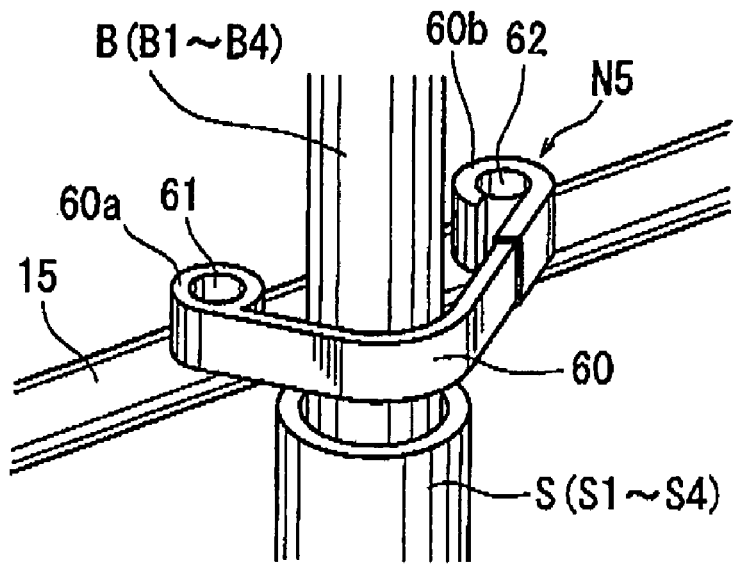
FIG. 9 is a partially perspective view of a tool bit restraint device of a power tool carrier according to a fifth representative embodiment.

The fifth detailed representative embodiment will now be described in detail with reference to FIG. 9.

Because the fifth embodiment relates to the first embodiment, only the constructions and elements that are different from the first embodiment will be explained in detail. Elements that are the same in the first and fifth embodiments will be identified by the same reference numerals and a detailed description of such elements may be omitted.

In this embodiment, the carrier 10 has a tool bit restraint device N5 in place of the tool bit restraint device N1 of the first embodiment. The tool bit restraint device N5 may preferably include four rubber bands 60 (the tool bit restraint member) and four pairs of engagement projections 61 and 62 in place of the rubber band 20 and the engagement projections 15a-15c of the tool bit restraint device N1 of the first embodiment. As will be appreciated, unlike the first embodiment, the tool bit restraint device N5 is constructed so as to separately fasten the first to fourth tool bits B1-B4 to the leg portions 12a and 12b of the handle 12 via the rubber bands 60.

Each of the rubber bands 60 (one of which is shown) has an apertured engagement portion 60a formed in one end thereof and a hook 60b attached to the other end thereof. Conversely, each pair of the engagement projections 61 and 62 (one pair of which is shown) is respectively attached to the reinforcement bar 15 so as to project upwardly therefrom. Further, each pair of the engagement projections 61 and 62 may respectively be positioned on the reinforcement bar 15 so as to substantially correspond to each of the bit holding sleeves S (the tool bits B). The engagement portion 60a of each of the rubber bands 60 is horizontally rotatably connected to the (left) engagement projection 61. Conversely, the hook 60b of each of the rubber bands 60 is constructed to engage the (right) engagement projection 62 while the rubber band 60 is wrapped around one of the tool bits B.

In order to fasten the first to fourth tool bits B1-B4 that are respectively received in the first to fourth bit holding sleeves S1-S4, the rubber bands 60 are respectively rotated about the engagement projections 61 so as to be wrapped around the tool bits B1-B4. Thereafter, the hooks 60b of the rubber bands 60 are respectively hooked on the engagement projections 62. As a result, as shown in FIG. 9, the first to fourth tool bits B1-B4 are respectively pressed rearwardly by elastic forces of the rubber bands 60. Thus, the first to fourth tool bits B1-B4 are respectively separately fastened via the rubber bands 60, so as to be put in restraint conditions in which they are restrained by the rubber bands 60. As a result, the first to fourth tool bits B1-B4 can be reliably retained in the first to fourth bit holding sleeves S1-S4.

Further, in order to take out one of the tool bits B from the bit holding sleeves S, for example, in order to take out the third tool bit B3 from the third bit holding sleeve S3, the hook 60b of the rubber band 60 corresponding to the third bit B3 is disengaged from the engagement projection 62, and then the rubber band 60 is simply rotated in the reverse direction about the engagement projection 61. As a result, the third tool bit B3 is put in a restraint release condition in which the third tool bit B3 is not restrained by the rubber band 60. Thus, the third tool bit B3 can be easily taken out from the third bit holding sleeve S3.

According to the tool bit restraint device N5, the tool bits B can be separately retained in the bit holding sleeves S. Therefore, the tool bit restraint device N5 is useful when some of the bit holding sleeves S are not occupied by the tool bits B.

Further, in this embodiment, the rubber bands 60 can be replaced with metal spring bands or other such members. In addition, the hooks 60b of the rubber bands 60 can be replaced with a clamp member or other such engagement members (not shown), if necessary.

Sixth Detailed Representative Embodiment

Figure 10:
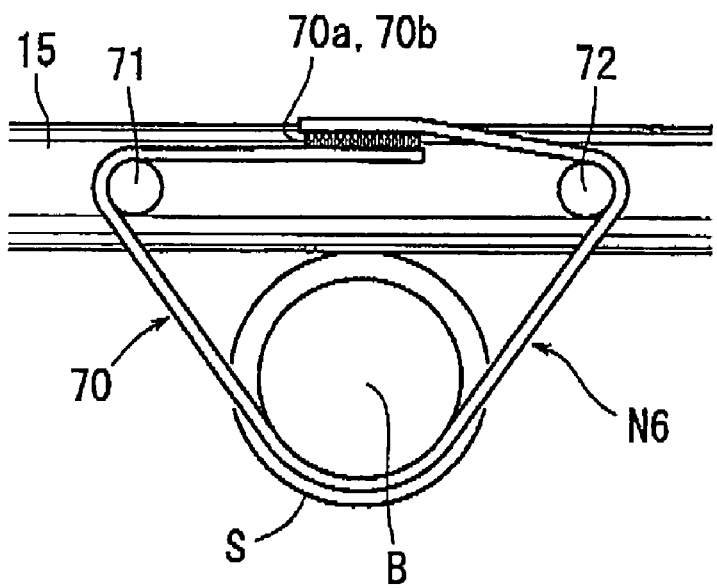
FIG. 10 is a partially plan view of a tool bit restraint device of a power tool carrier according to a sixth representative embodiment.

The Sixth detailed representative embodiment will now be described in detail with reference to FIG. 10.

Because the sixth embodiment relates to the fifth embodiment, only the constructions and elements that are different from the fifth embodiment will be explained in detail. Elements that are the same in the fifth and sixth embodiments will be identified by the same reference numerals and a detailed description of such elements may be omitted.

In this embodiment the carrier 10 has a tool bit restraint device N6 in place of the tool bit restraint device N5 of the fifth embodiment. Unlike the tool bit restraint device N5, the tool bit restraint device N6 may include fastener bands 70 (the tool bit restraint member) having hook and loop fasteners in place of the rubber bands 60 of the tool bit restraint device N5 of the fifth embodiment. Each of the fastener bands 70 (one of which is shown) has a hook surface member 70a attached to one end thereof and a loop surface member 70b attached to the other end thereof. Further, the tool bit restraint device N6 may include four pairs of engagement projections 71 and 72 (one pair of which is shown) that correspond to the engagement projections 61 and 62 of the tool bit restraint device N5 of the fifth embodiment.

In order to fasten the first to fourth tool bits B1-B4 that are respectively received in the first to fourth bit holding sleeves S1-S4, the fastener bands 70 are respectively wound around the engagement projections 71 and 72 and the tool bits B. Thereafter, the hook surface members 70a and the loop surface members 70b attached to the fastener bands 70 are engaged with each other, so as to fasten the fastener bands 70. As a result, as shown in FIG. 10, the first to fourth tool bits B1-B4 are respectively pressed rearwardly by the fastener bands 70. Thus, the first to fourth tool bits B1-B4 are respectively separately fastened via the fastener bands 70, so as to be put in restraint conditions in which they are restrained by the fastener bands 70. As a result, the first to fourth tool bits B1-B4 can be reliably retained in the first to fourth bit holding sleeves S1-S4.

Further, in order to take out one of the tool bits B from the bit holding sleeves S, the hook surface member 70a and the loop surface member 70b of the fastener band 70 corresponding to the target tool bit B is disengaged from each other, so as to unfasten the fastener bands 70. As a result, the target tool bit B is put in a restraint release condition in which the target tool bit B is not restrained by the fastener band 70. Thus, the target tool bit B can be easily taken out from the corresponding bit holding sleeve S.

Seventh Detailed Representative Embodiment

The Seventh detailed representative embodiment will now be described in detail with reference to FIG. 1.

Because the seventh embodiment relates to the fifth embodiment, only the constructions and elements that are different from the fifth embodiment will be explained in detail. Elements that are the same in the fifth and seventh embodiments will be identified by the same reference numerals and a detailed description of such elements may be omitted.

In this embodiment, the carrier 10 has a tool bit restraint device N7 in place of the tool bit restraint device N5 of the fifth embodiment. The tool bit restraint device N7 may preferably include two rubber bands 80 and 81 (the tool bit restraint member) and three engagement projections 82, 83 and 84 in place of the rubber bands 60 and the engagement projections 61 and 62 of the tool bit restraint device N5 of the fifth embodiment. As will be appreciated, unlike the fifth embodiment, the tool bit restraint device N7 is constructed so as to fasten the first to fourth tool bits B1-B4 in groups of two (two by two).

Each of the rubber bands 80 and 81 has the substantially same construction as the rubber band 60 of the tool bit restraint device N5. That is, the rubber band 80 has an apertured engagement portion 80a formed in one end thereof and a hook 80b attached to the other end thereof. Similarly, the rubber band 81 has an apertured engagement portion 81a formed in one end thereof and a book 81b attached to the other end thereof. Conversely, the engagement projections 82, 83 and 84 are positioned on the reinforcement bar 15 at substantially equal intervals.

The engagement portion 80a of the rubber band 80 is horizontally rotatably connected to the engagement projection 82. Conversely, the hook 80b of the rubber band 80 is constructed to engage the engagement projection 83 while the rubber band 80 is wrapped around first and second tool bits B1 and B2. Similarly, the engagement portion 81a of the rubber band 81 is horizontally rotatably connected to the engagement projection 83. Conversely, the hook 81b of the rubber band 81 is constructed to engage the engagement projection 84 while the rubber band 81 is wrapped around third and fourth tool bits B3 and B4.

Figure 11:
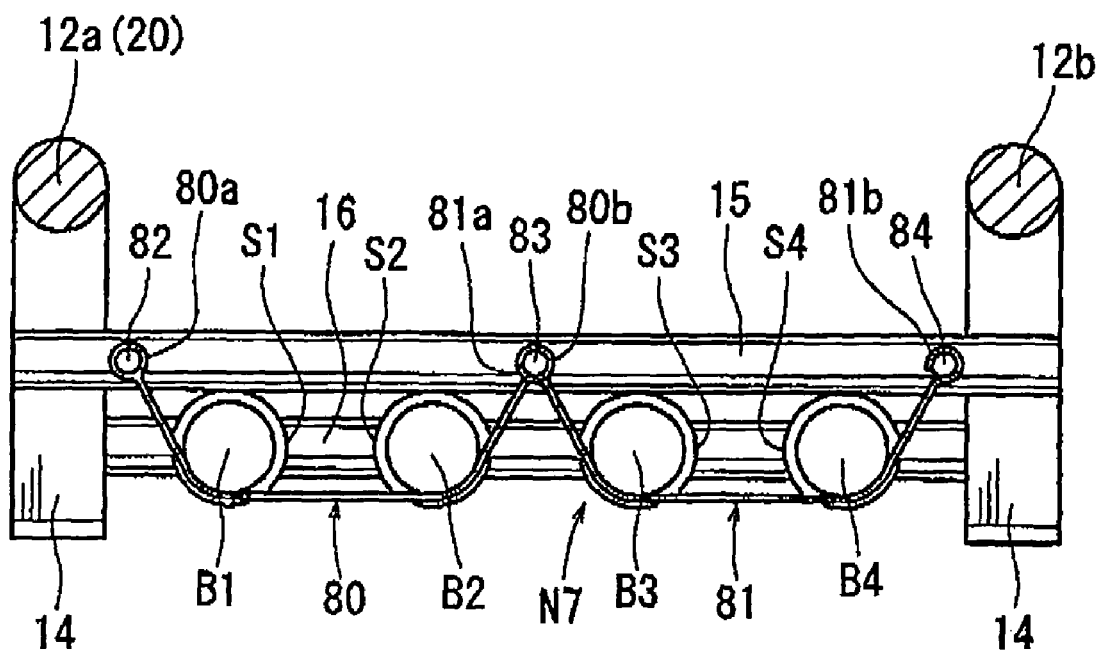
FIG. 11 is a plan view of a tool bit restraint device of a power tool carrier according to a seventh representative embodiment.

In order to fasten the first to fourth tool bits B1-B4 that are respectively received in the first to fourth bit holding sleeves S1-S4, the rubber band 80 is rotated about the engagement projection 82 so as to be wrapped around the first and second tool bits B1 and B2. Thereafter, the hook 80b of the rubber band 80 is hooked on the engagement projection 83. Similarly, the rubber band 81 is rotated about the engagement projection 83 so as to be wrapped around the third and fourth tool bits B3 and B4. Thereafter, the hook 81b of the rubber band 81 is hooked on the engagement projection 84. As a result, as shown in FIG. 11, the first and second tool bits B1 and B2 are pressed rearwardly by elastic forces of the rubber band 80. Similarly, the third and fourth tool bits B3 and B4 are pressed rearwardly by elastic forces of the rubber band 81. Thus, the first to fourth toot bits B1-B4 are fastened via the rubber bands 80 and 81, so as to be put in restraint conditions in which they are restrained by the rubber bands 80 and 81. As a result, the first to fourth toot bits B1-B4 can be reliably retained in the first to fourth bit holding sleeves S1-S4.

Further, in order to take out one of the tool bits B from the bit holding sleeves S, for example, in order to take out the third tool bit B3 from the third bit holding sleeve S3, the hook 81b of the rubber band 81 is disengaged from the engagement projection 84, and then the rubber band 81 is simply rotated in the reverse direction about the engagement projection 83. As a result, the third and fourth tool bits B3 and B4 are simultaneously put in restraint release conditions in which the third and fourth tool bits B3 and B4 are not restrained by the rubber band 81. Thus, the third tool bit B3 can be easily taken out from the third bit holding sleeve S3.

Eighth Detailed Representative Embodiment

Figure 12:
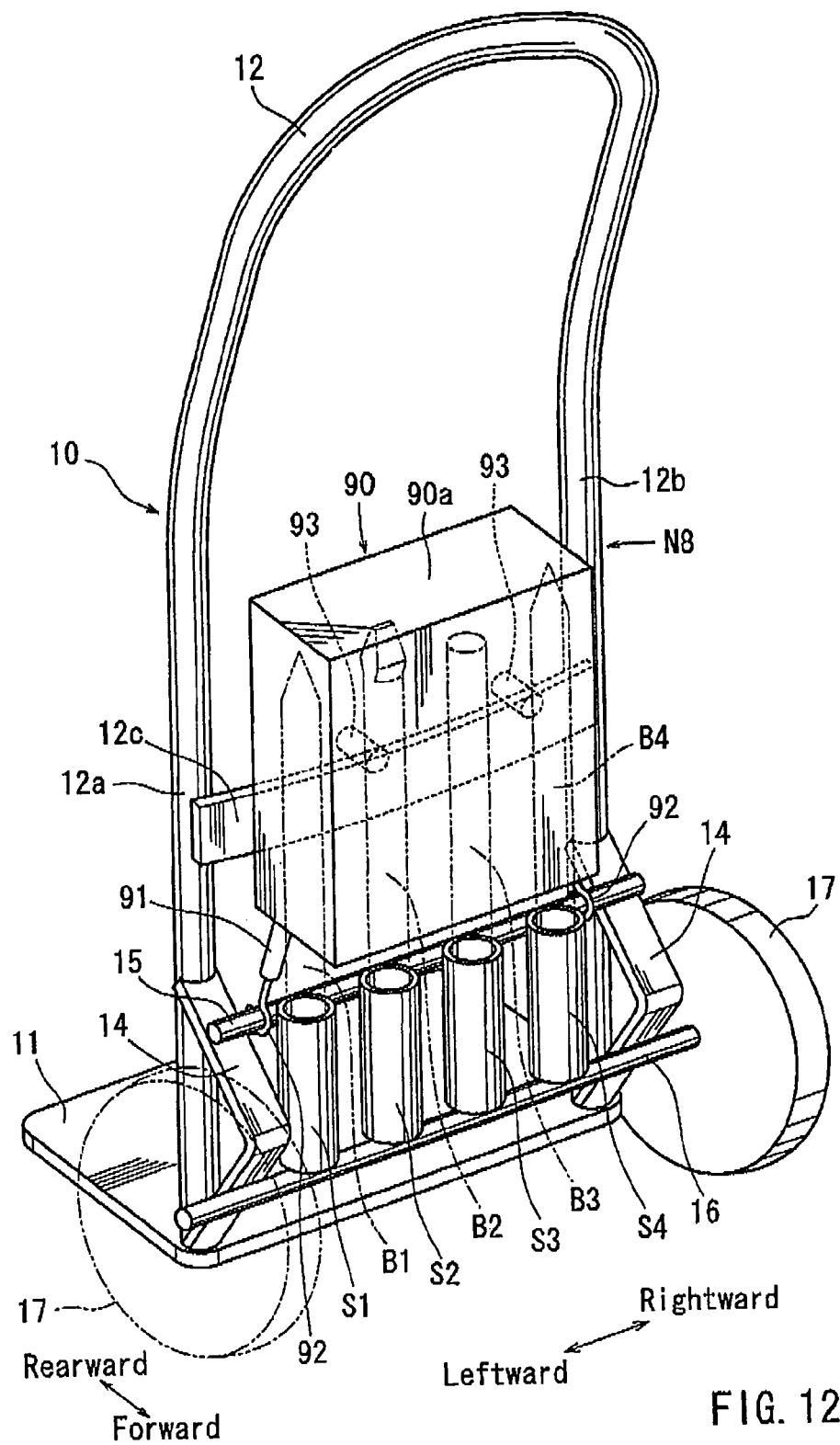
FIG. 12 is a front perspective view of a power tool carrier according to an eighth representative embodiment.

The eighth detailed representative embodiment will now be described in detail with reference to FIG. 12.

Because the eighth embodiment relates to the first embodiment, only the constructions and elements that are different from the first embodiment will be explained in detail. Elements that are the same in the first and eighth embodiments will be identified by the same reference numerals and a detailed description of such elements may be omitted.

In this embodiment, the carrier 10 has a tool bit restraint device N8 in place of the tool bit restraint device N1 of the first embodiment. The tool bit restraint device N8 may preferably include a bottomless box-shaped bit cover 90 (the tool bit restraint member) and a pair of extendable fixture members 91 (the engagement member) in place of the rubber band 20 and the engagement projections 15a-15c of the tool bit restraint device N1. The bit cover 90 is constructed so as to be capable of covering all of the tool bits B. The bit cover 90 has a pair of stopper projections 93 that are attached to a rear surface of the bit cover 90 so as to be projected rearwardly.

The stopper projections 93 are laterally spaced from each other. In addition, the stopper projections 93 may preferably be positioned bilaterally symmetrically on the rear surface of the bit cover 90. Conversely, the fixture members 91 are respectively attached to right and left lower end portions of the bit cover 90 so as to extend downwardly therefrom. Each of the fixture members 91 has a hook 92 that is attached to a distal (lower) end thereof.

In order to fasten the first to fourth tool bits B1-B4 that are respectively received in the first to fourth bit holding sleeves S1-S4, first, the bit cover 90 is placed on the first to fourth tool bits B1-B4 such that an upper wall 90a (a wall portion) thereof can be positioned vertically opposite to the first to fourth tool bits B1-B4, thereby covering the same. At this time, the stopper projections 93 contact or engage an upper surface of the reinforcement plate 12c, so that the bit cover 90 can be retained in a desired position. Subsequently, the hooks 92 are hooked on the reinforcement bar 15 while the fixture members 91 are respectively pulled downwardly, so that the bit cover 90 can be fixed to the leg portions 12a and 12b of the handle 12. Thus, as shown in FIG. 12, the first to fourth tool bits B1-B4 are wholly covered by the bit cover 90, so as to be put in restraint conditions in which they are restrained by the bit cover 90. As a result, the first to fourth tool bits B1-B4 can be reliably retained in the first to fourth bit holding sleeves S1-S4, so as to be effectively prevented from being dropped out of the first to fourth bit holding sleeves S1-S4.

As previously described, the tool bits B can be covered by the bit cover 90 while the upper wall 90a of the bit cover 90 is positioned vertically opposite to the tool bits B. Therefore, the tool bits B can be reliably prevented from being dropped out of the bit holding sleeves S even when the carrier 10 is in the lying position.

Further, in order to take out one of the tool bits B from the bit holding sleeves S, for example, in order to take out the third tool bit B3 from the third bit holding sleeve S3, the hook 92 of the fixture members 91 is disengaged from the reinforcement bar 15. Thereafter, the bit cover 90 is removed from the leg portions 12a and 12b of the handle 12. As a result, the tool bits B are put in restraint release conditions in which they are not restrained by the bit cover 90. Thus, the third tool bit B3 can be easily taken out from the third bit holding sleeve S3.

Further, in the tool bit restraint device N8, the bit cover 90 can be fixed to the leg portions 12a and 12b of the handle 12 while the stopper projections 93 engage the reinforcement plate 12c. Therefore, the bit cover 90 can be stably positioned on the leg portions 12a and 12b of the handle 12. Thus, the bit cover 90 can be effectively prevented from inclining even if some of the bit holding sleeves S are not occupied by the tool bits B.

Further, in the tool bit restraint device N8, the bit cover 90 can be detached from the leg portions 12a and 12b of the handle 12, if necessary. Further, the tool bits B can be completely covered by the bit cover 90, the user can be prevented from being injured by the tool bits B.

Ninth Detailed Representative Embodiment

The ninth detailed representative embodiment will now be described in detail with reference to FIGS. 13 and 14.

Because the ninth embodiment relates to the fourth embodiment, only the constructions and elements that are different from the fourth embodiment will be explained in detail. Elements that are the same in the fourth and ninth embodiments will be identified by the same reference numerals and a detailed description of such elements may be omitted.

In this embodiment, the carrier 10 has a tool bit restraint device N9 in place of the tool bit restraint device N4 of the fourth embodiment. However, unlike the tool bit restraint device N4, the tool bit restraint device N9 may preferably include a restraint frame 100 (the tool bit restraint member). The restraint frame 100 is rotatably connected to the brackets 14 via support sleeves 105 and 106, so as to be rotatable vertically (forwardly and rearwardly) between a rotational position (a fastening position) shown by solid lines in FIG. 13 and a rotational position (a release position) shown by broken lines in FIG. 13.

Figure 14:
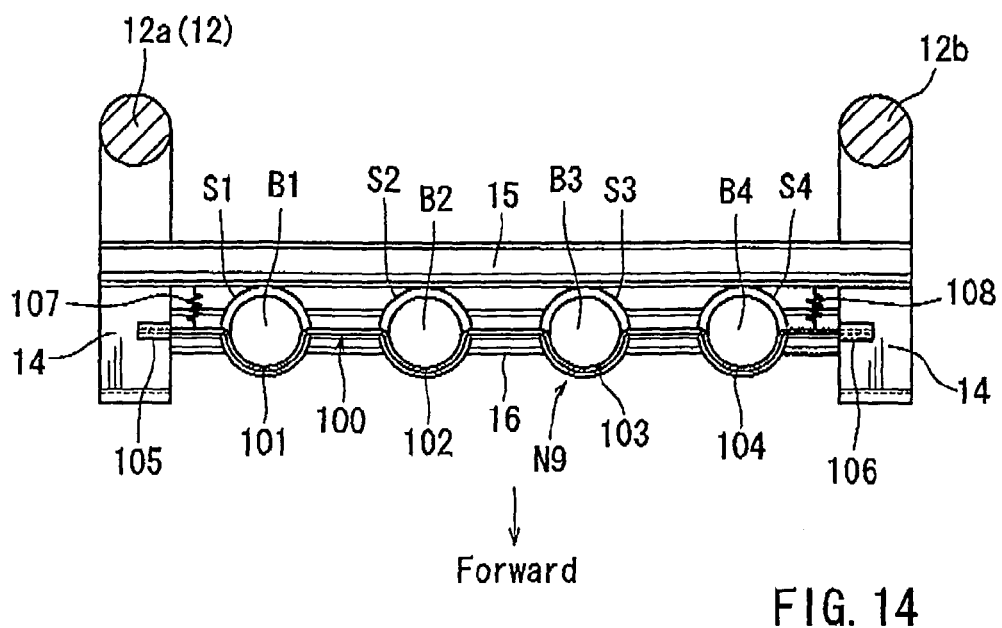
FIG. 14 is a plan view of a tool bit restraint device of the power tool carrier.

As shown in FIG. 14, four hemicircle-shaped retainer recesses 101-104 are formed in the restraint frame 100. Each of the retainer recesses 101-104 is opened rearwardly and has the substantially same diameter as the diameter of each of the tool bits B. Further, the retainer recesses 40c may preferably be formed at the substantially same intervals as the bit holding sleeves S (the tool bits B). Also, the restraint frame 100 is connected to the reinforcement bar 15 via tension coil springs 107 and 108 positioned adjacent to the support sleeves 105 and 106, so as to be normally biased rearwardly.

Figure 13:
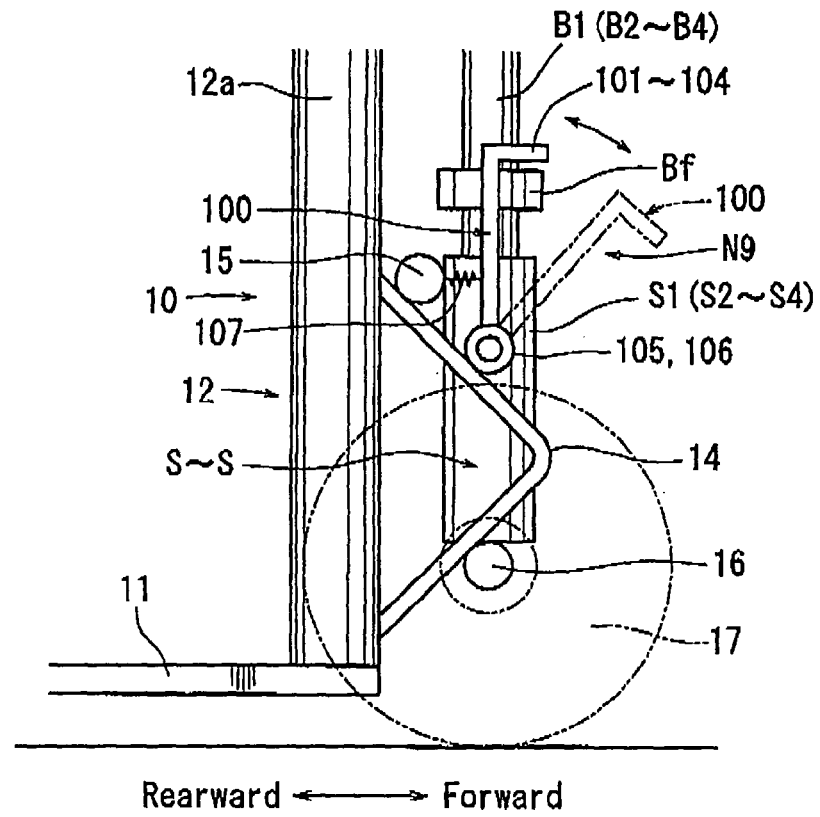
FIG. 13 is a partially side view of a power tool carrier according to a ninth representative embodiment.

In this embodiment, the first to fourth tool bits B1-B4 are respectively inserted into the first to fourth bit holding sleeves S1-S4 while the retainer frame 100 is forwardly rotated by hand to the rotational position shown by broken lines in FIG. 13. Therefore, in order to fasten the first to fourth tool bits B1-B4 that are respectively received in the first to fourth bit holding sleeves S1-S4, the retainer frame 100 is simply released. As will be appreciated, upon release, the retainer frame 100 can be automatically rotated rearwardly by spring forces of the tension coil springs 107 and 108, so as to be positioned in the rotational position shown by solid lines in FIG. 13. As a result, as shown in FIG. 14, the retainer recesses 101-104 of the retainer frame 100 respectively engage the first to fourth tool bits B1-B4, so as to press the first to fourth tool bits B1-B4 rearwardly by spring forces of the tension coil springs 107 and 108. Thus, the first to fourth tool bits B1-B4 are fastened substantially uniformly via the retainer frame 100, so as to be put in restraint conditions in which they are restrained by the retainer frame 100. As a result, the first to fourth tool bits B1-B4 can be reliably retained in the first to fourth bit holding sleeves S1-S4.

Further, the tool bit restraint device N9 is particularly useful for retaining the tool bits B having flanged portions Bf. In order to use the tool bit restraint device N9 for retaining the tool bits B having the flanged portions Bf, as shown in FIG. 13, the retainer frame 100 may preferably be arranged and constructed such that the retainer recesses 101-104 can be positioned above the flanged portions Bf of the tool bits B when the retainer frame 100 is positioned in the rotational position shown by solid lines in FIG. 13. According to the retainer frame 100 thus arranged and constructed, the tool bits B can be further effectively prevented from being dropped out of the bit holding sleeves S because the flanged portions Bf of the tool bits B can engage the retainer frame 100 (the retainer recesses 101 to 104) when the tool bits B are forced to be dropped out of the bit holding sleeves S.

Further, in order to take out one of the tool bits B from the bit holding sleeves S, for example, in order to take out the third tool bit B3 from the third bit holding sleeve S3, the retainer frame 100 is simply rotated by hand toward the rotational position shown by broken lines in FIG. 13 against the spring forces of the tension coil springs 107 and 108. As a result, all of the tool bits B are put in restraint release conditions in which they are not restrained by the retainer frame 100. Thus, the third tool bit B3 can be easily taken out from the third bit holding sleeve S3.

Tenth Detailed Representative Embodiment

Figure 15:
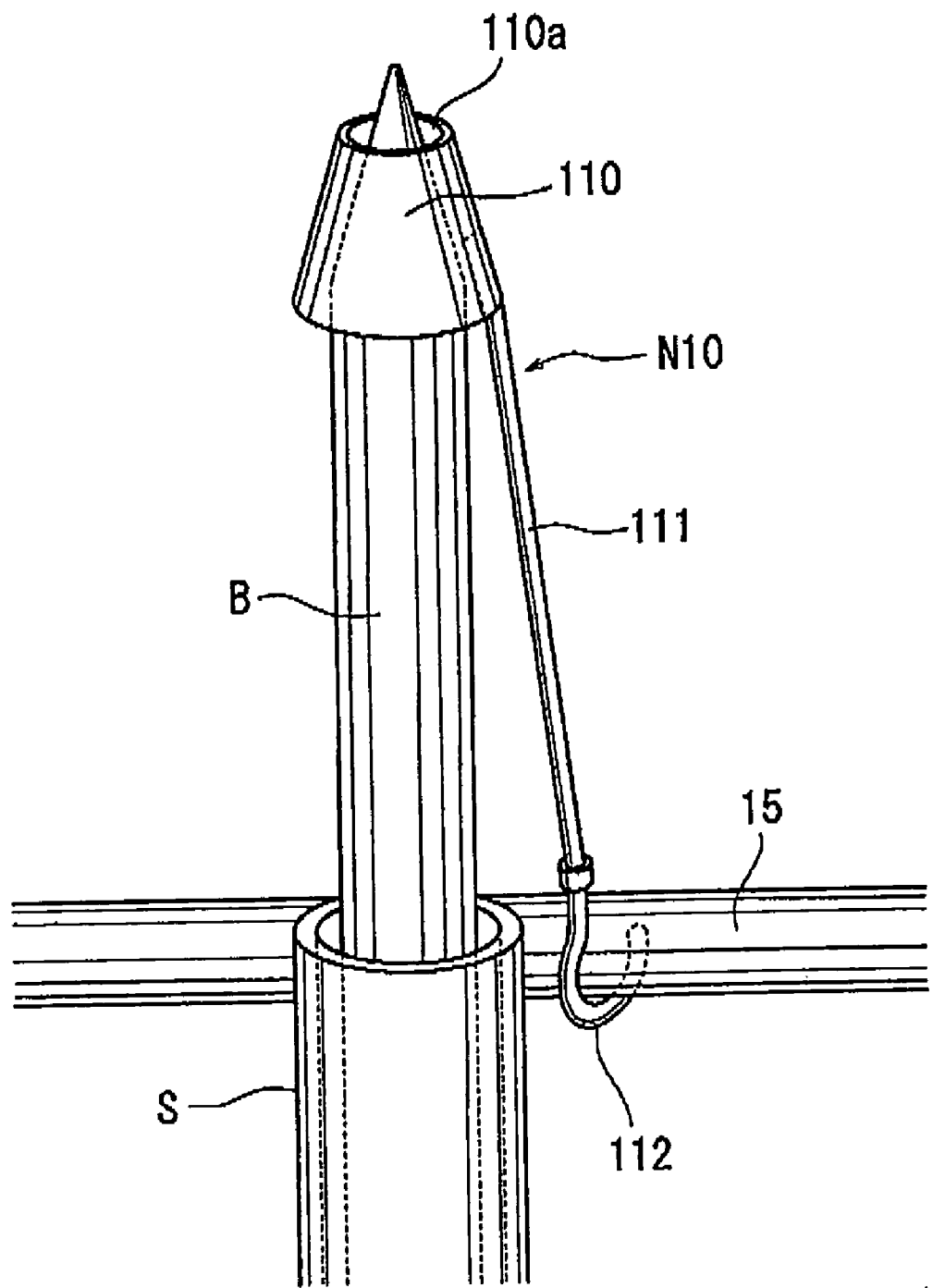
FIG. 15 is a partially perspective view of a tool bit restraint device of a power tool carrier according to a tenth representative embodiment.

The tenth detailed representative embodiment will now be described in detail with reference to FIG. 15.

Because the tenth embodiment relates to the eighth embodiment, only the constructions and elements that are different from the eighth embodiment will be explained in detail. Elements that are the same in the eighth and tenth embodiments will be identified by the same reference numerals and a detailed description of such elements may be omitted.

In this embodiment, the carrier 10 has a tool bit restraint device N10 in place of the tool bit restraint device N8 of the eighth embodiment. The tool bit restraint device N10 may preferably include four open-ended hollow conical bit covers 110 (the tool bit restraint member) and four rubber fixture members 111 (the engagement member) in place of the bit cover 90 and the fixture members 91 of the tool bit restraint device N8. Each of the bit covers 110 (one of which is shown) may preferably be shaped so as to correspond to a shape of a tapered nose of each of the tool bits B. Also, each of the bit covers 110 may preferably be shaped such that a portion of the tapered nose of each of the tool bits B is projected through an upper opening 110a thereof when the bit covers 110 are placed on the tool bits B. Conversely, the fixture members 111 (one of which is shown) are respectively attached to the bit covers 110 so as to extend downwardly therefrom. Each of the fixture members 111 has a hook 112 that is attached to a distal (lower) end thereof.

In order to fasten the tool bits B that are respectively received in the bit holding sleeves S, first, the bit covers 110 are respectively placed on the tapered noses of the tool bits B. Subsequently, the hooks 112 of the fixture members 111 are hooked on the reinforcement bar 15 while the fixture members 111 are respectively pulled downwardly, so that the bit covers 110 can be fixed to the leg portions 12a and 12b of the handle 12. Thus, as shown in FIG. 15, the tool bits B are respectively separately anchored to the leg portions 12a and 12b of the handle 12 via the bit covers 110, so as to be put in restraint conditions in which they are restrained by the bit covers 110. As a result, the tool bits B can be reliably retained in the bit holding sleeves S, so as to be effectively prevented from being dropped out of the bit holding sleeves S.

Further, in order to take out one of the tool bits B from the bit holding sleeves S, the hook 112 of the fixture member 111 of the bit cover 110 corresponding to the target tool bit B is disengaged from the reinforcement bar 15, so as to remove the bit cover 110 from the leg portions 12a and 12b of the handle 12. As a result, the target tool bit B is put in a restraint release condition in which it is not restrained by the bit cover 110. Thus, the target tool bit B can be easily taken out from the corresponding bit holding sleeve S.

According to the tool bit restraint device N10, the tool bits B can be separately retained in the bit holding sleeves S. Therefore, the tool bit restraint device N10 is useful when some of the bit holding sleeves S are not occupied by the tool bits B.

Further, in this embodiment, the bit covers 110 can be replaced with ring-shaped bit covers (not shown) and hollow conical bit covers (not shown). In addition, two or more fixture members (not shown) can be attached to each of the bit covers 110, if necessary.

Eleventh Detailed Representative Embodiment

The eleventh detailed representative embodiment will now be described in detail with reference to FIG. 16.

Because the eleventh embodiment relates to the eighth embodiment, only the constructions and elements that are different from the eighth embodiment will be explained in detail. Elements that are the same in the eighth and eleventh embodiments will be identified by the same reference numerals and a detailed description of such elements may be omitted.

In this embodiment, the carrier 10 has a tool bit restraint device N11 in place of the tool bit restraint device N8 of the eighth embodiment The tool bit restraint device N11 may preferably include a rearwardly and downwardly opened box-shaped bit cover 120 (the tool bit restraint member) in place of the bit cover 90 of the tool bit restraint device N8. The bit cover 120 is rotatably connected to the leg portions 12a and 12b of the handle 12 via support shafts 121 (one of which is shown) attached to side walls 120a thereof (one of which is shown), so as to be rotatable vertically (forwardly and rearwardly) between a lower (covering) rotational position shown by solid lines in FIG. 16 and an upper (open) rotational position shown by broken lines in FIG. 16. As will be appreciated, the bit cover 120 may preferably be arranged and constructed so as to cover all of the tool bits B when it is rotated to the lower rotational position thereof. Further, a pair of stopper projections 122 (one of which is shown) are attached to the leg portions 12a and 12b of the handle 12. The stopper projections 122 are arranged and constructed to contact the bit cover 120 (the side walls 120a) when the bit cover 120 is rotated to the lower rotational position thereof, thereby reliably maintaining the bit cover 120 in the rotational position.

Figure 16:
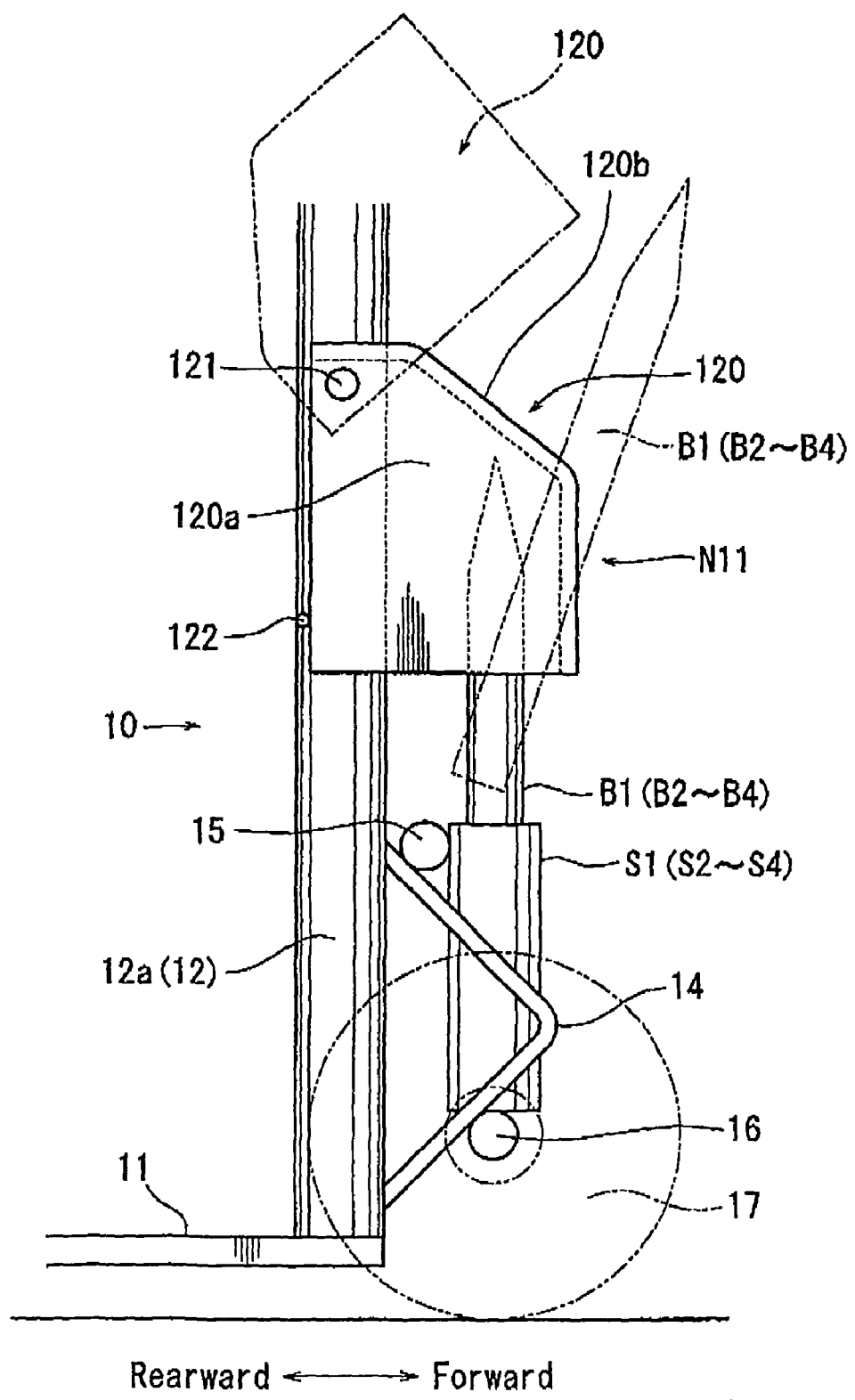
FIG. 16 is a partially side view of a power tool carrier having a power tool carrier according to a eleventh representative embodiment.

In this embodiment, the first to fourth tool bits B1-B4 are respectively inserted into the first to fourth bit holding sleeves S1-S4 while the bit cover 120 is rotated by hand to the upper rotational position shown by broken lines in FIG. 16. Therefore, in order to fasten (cover) the first to fourth tool bits B1-B4 that are respectively received in the first to fourth bit holding sleeves S1-S4, the bit cover 120 is simply rotated downwardly by hand to the lower rotational position. Upon downward rotation, the bit cover 120 can be maintained in the lower rotational position shown by solid lines in FIG. 16, so as to wholly cover the first to fourth tool bits B1-B4. At this time, an upper wall 120b (a wall portion) of the bit cover 120 can be positioned vertically opposite to the first to fourth tool bits B1-B4. Thus, the first to fourth tool bits B1-B4 are put in restraint conditions in which they are restrained by the bit cover 120. As a result, the first to fourth tool bits B1-B4 can be reliably retained in the first to fourth bit holding sleeves S1-S4, so as to be effectively prevented from being dropped out of the fast to fourth bit holding sleeves S1-S4.

Further, in order to take out one of the first to fourth tool bits B1-B4 from the first to fourth bit holding sleeves S1-S4, for example, in order to take out the third tool bit B3 from the third bit holding sleeve S3, the bit cover 120 is simply rotated upwardly by hand to the upper rotational position. As a result, the first to fourth tool bits B1-B4 are put in restraint release conditions in which they are not restrained by the bit cover 120. Thus, the third tool bit B3 can be easily taken out from the third bit holding sleeve S3.

Various changes and modifications may be made to the present invention without departing from the scope of the previously shown and described embodiments. For example, the bit holding sleeves S can be replaced with bit holding members each of which is composed of two or more rings.

Further, the present invention can be applied to a tool bit carrier that is constructed to carry only the tool bits B.

What is claimed is:

1. A carrier configured to carry a power tool, comprising:
   a plurality of tool bit holders respectively supporting a plurality of tool bits; and
   a tool bit restraint device configured to prevent the plurality of tool bits from being dropped out of the plurality of tool bit holders,
   wherein the tool bit restraint device includes at least one tool bit restraint band that is detachably connected to the carrier, and
   wherein the at least one tool bit restraint band is configured to press at least one of the plurality of tool bits so as to substantially uniformly restrain the plurality of tool bits in the plurality of tool bit holders.

2. The carrier as defined in claim 1, wherein the at least one tool bit restraint band comprises an elastomer band.

3. The carrier as defined in claim 2, wherein the elastomer band is arranged and constructed to fasten the plurality of tool bits to the carrier separately or two by two.

4. The carrier as defined in claim 3, wherein the carrier comprises a handle having a reinforcement member, and
   wherein the elastomer band is detachably connected to the handle and is configured to engage at least one of engagement projections attached to the reinforcement member.

5. The carrier as defined in claim 3, wherein the carrier comprises a handle having a fixture plate, and
   wherein the elastomer band is detachably connected to the handle while the elastomer band is inserted into insertion holes formed in the fixture plate.

6. The carrier as defined in claim 1, wherein the at least one tool bit restraint band comprises a plurality of elastomer bands.

7. The carrier as defined in claim 6, wherein the plurality of elastomer bands are respectively arranged and constructed to fasten each of the plurality of tool bits to the carrier separately.

8. The carrier as defined in claim 6, wherein the plurality of elastomer bands are respectively arranged and constructed to fasten the plurality of tool bits to the carrier two by two.

9. The carrier as defined in claim 1, wherein the at least one tool bit restraint band comprises a spring band.

10. The carrier as defined in claim 9, wherein the spring band is arranged and constructed to fasten each of the plurality of tool bits to the carrier separately.

11. The carrier as defined in claim 1, wherein the tool bit restraint device comprises one or a plurality of engagement projections situated between the plurality of tool bit holders.

12. A carrier configured to carry a power tool, comprising:
    a plurality of tool bit holders respectively in contact with and supporting proximal ends of a plurality of tool bits; and
    a tool bit restraint device that is configured to prevent the plurality of tool bits from being dropped out of the plurality of tool bit holders,
    wherein the tool bit restraint device includes a tool bit restraint member, and
    wherein the tool bit restraint member is configured to cover distal ends of the plurality of tool bits, thereby restraining the plurality of tool bits.

13. The carrier as defined in claim 12, wherein the tool bit restraint member comprises a bit cover that is detachably connected to the carrier.

14. The carrier as defined in claim 13, wherein the bit cover is arranged and constructed to wholly cover the plurality of tool bits.

15. The carrier as defined in claim 12, wherein the tool bit restraint member comprises a plurality of bit covers that are detachably connected to the carrier.

16. The carrier as defined in claim 15, wherein the plurality of bit covers are respectively arranged and constructed to cover each of the plurality of tool bits separately.

17. The carrier as defined in claim 12, wherein the tool bit restraint member comprises a bit cover that is rotatably connected to the carrier.

18. The carrier as defined in claim 17, wherein the bit cover is arranged and constructed to wholly cover the plurality of tool bits.

19. A carrier configured to carry a power tool, comprising:
a plurality of tool bit holders respectively supporting a plurality of tool bits; and
a tool bit restraint device configured to prevent the plurality of tool bits from being dropped out of the plurality of tool bit holders,
wherein the tool bit restraint device includes a restraint frame, and
wherein the restraint frame is rotatably connected to the carrier via a spring and is configured to press the plurality of tool bits, so as to substantially uniformly restrain the plurality of tool bits in the plurality of tool bit holders.

20. The carrier as defined in claim 19, wherein the restraint frame is arranged and constructed to fasten each of the plurality of tool bits to the carrier separately.

* * * * *